(12) United States Patent
Braun et al.

(10) Patent No.: US 7,234,387 B2
(45) Date of Patent: Jun. 26, 2007

(54) FACE WALL FOR A MOTOR VEHICLE

(75) Inventors: Marco Braun, Lug (DE); Steve Kober, Treuen (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 10/529,797

(22) PCT Filed: Oct. 2, 2003

(86) PCT No.: PCT/EP03/10950

§ 371 (c)(1),
(2), (4) Date: Dec. 5, 2005

(87) PCT Pub. No.: WO2004/033274

PCT Pub. Date: Apr. 22, 2004

(65) Prior Publication Data

US 2006/0117747 A1    Jun. 8, 2006

(30) Foreign Application Priority Data

Oct. 2, 2002    (DE) .............................. 102 46 995

(51) Int. Cl.
  *B62D 25/08*    (2006.01)
  *B60T 13/567*    (2006.01)
(52) U.S. Cl. .................... 92/169.2; 92/128; 92/161
(58) Field of Classification Search ................ 60/533, 60/547.1; 92/128, 146, 161, 169.2, 169.3, 92/169.4
See application file for complete search history.

(56) References Cited

U.S. PATENT DOCUMENTS

| 4,353,430 A | 10/1982 | Sjoqvist et al. |
| 4,455,829 A * | 6/1984 | Seip ........................... 92/169.4 |
| 4,594,854 A | 6/1986 | Takeuchi et al. |
| 4,658,660 A | 4/1987 | Parker |
| 4,662,237 A * | 5/1987 | Kami et al. .................... 92/161 |
| 5,167,305 A * | 12/1992 | Cadeddu .................... 60/547.1 |
| 5,233,833 A * | 8/1993 | Last et al. ..................... 92/99 |
| 5,531,135 A * | 7/1996 | Dolla ........................... 74/560 |

FOREIGN PATENT DOCUMENTS

| DE | 35 22 203 A1 | 1/1987 |
| DE | 195 34 656 A1 | 3/1997 |
| DE | 100 41 711 A1 | 3/2002 |
| EP | 0 338 923 A1 | 10/1989 |
| JP | 03045461 | 2/1991 |
| WO | WO 99/15238 | 4/1999 |

OTHER PUBLICATIONS

PCT International Search Report for PCT/EP2003/010950 completed by the European Searching Authority on Jan. 20, 2004.

* cited by examiner

*Primary Examiner*—Thomas E. Lazo
(74) *Attorney, Agent, or Firm*—Barnes & Thornburg LLP

(57) ABSTRACT

A face wall for a motor vehicle comprises a first wall and a second wall that is disposed at a distance from the first wall. The first wall is provided with a recess for accommodating a brake booster that is fastened exclusively to the first wall. This assembly permits effective soundproofing in the area of the face wall, thereby increasing comfort during driving.

20 Claims, 2 Drawing Sheets

FACE WALL FOR A MOTOR VEHICLE

Figure 1:
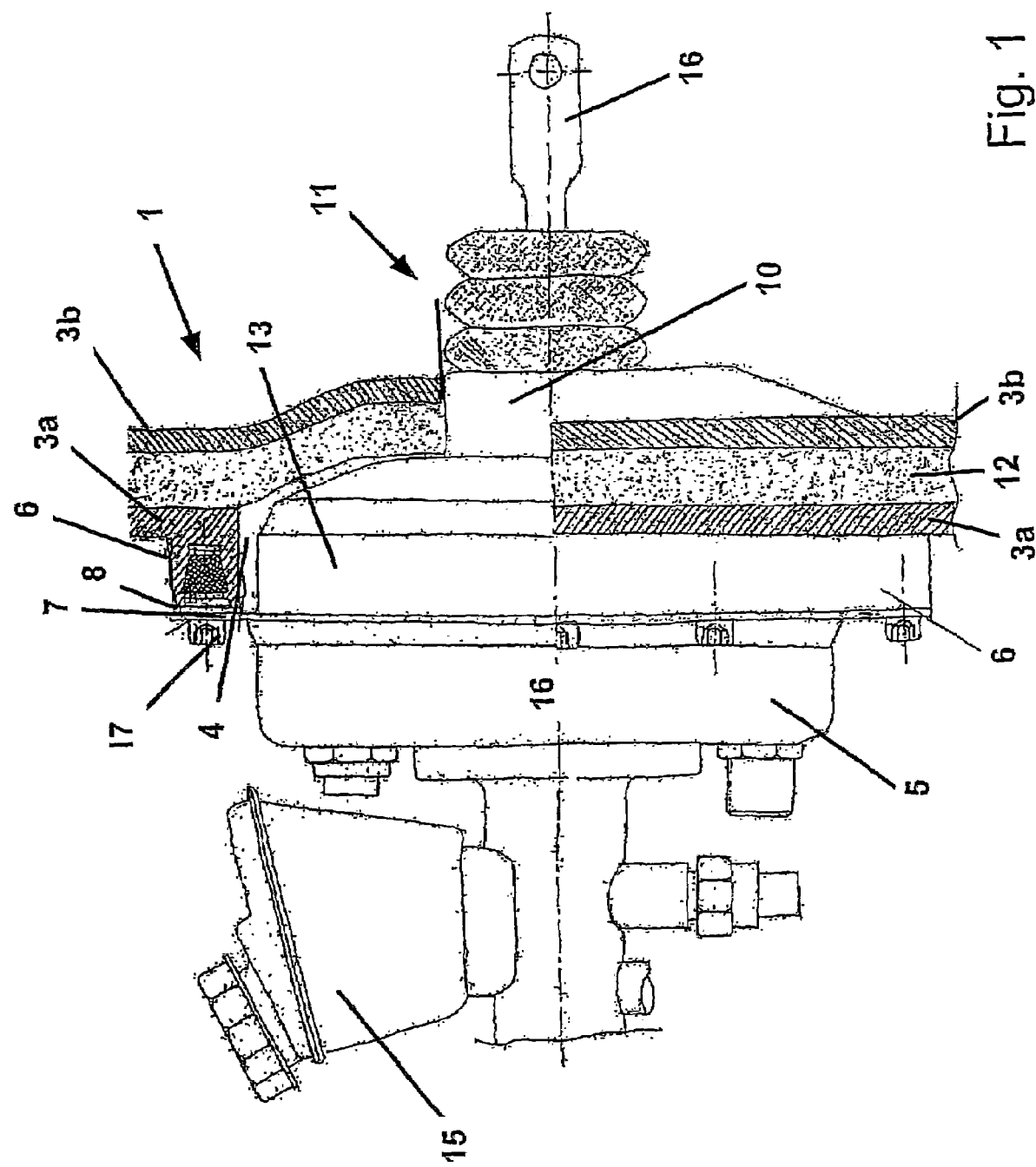

This application is the U. S. national phase of PCT/EP2003/10950 filed Oct. 2, 2003. PCT/EP2003/10950 claims the benefit of the filing date of German patent application 102 46 995.4 filed Oct. 2, 2002.

The present invention relates to a face wall (also known as front wall) for a motor vehicle.

Face walls for motor vehicles are known in principle. In particular in the wake of requirements for light-weight construction and increased comfort standards in modern motor vehicles, there is therefore the task of producing face walls which on the one hand are light in weight and on the other hand have high rigidity. This is firstly advantageously a high flexural strength which comes into play especially in the case of a head-on crash, and also shear rigidity, which in the case of longitudinal torsion of the bodywork helps to limit the deformation and thus to increase the comfort.

In principle there is a known way of coupling components such as brake boosters (or "main brake cylinders") securely to a face wall. This can come about for example in that the brake booster is secured to one side of a face wall (usually the side of the engine compartment) and is fixed to the face wall on both sides with through bolts. For the case in which the face wall contains a sandwich structure, selected for reasons of lightweight construction (i.e. a first wall as well as a second wall at a spacing therefrom with foam lying in between the two walls), in this gap a sleeve is usually provided in addition which prevents the compression of the sandwich structure in the region of the foam layer when the bolts are tightened.

Such known solutions have admittedly on the one hand good stability, however the noise properties of such face walls are generally unsatisfactory. It is usually necessary, in the case of such face walls, which are produced in a sandwich structure for reasons of lightweight construction, to attach e.g. an additional heavy matting on the side of the vehicle interior, which helps with sound absorption. However the requirements of lightweight construction are again partially destroyed by this measure.

It is therefore the object of the present invention to make available a face wall which on the one hand is light in weight and stable but which nevertheless still meets the highest standards in relation to sound-proofing properties.

This object is accomplished by a face wall according to claim 1.

Because in a face wall of this type, which has a first wall and a second wall at a spacing therefrom, the first wall has a recess to accommodate a brake booster or "main brake cylinder" which is secured solely to the first wall, the above-mentioned problems are avoided.

Firstly it contributes to the lightweight construction that the first wall is recessed in the region of the brake booster i.e. it is not necessary to provide here practically a "double wall" since the brake booster practically bridges the face wall in the region of the recess and therefore no face wall itself is necessary in this region or at least the first wall disappears in regions.

What is also essential here is that the brake booster is only attached to the first wall. For this attachment, a connection such as a screw connection which can be easily detached for repair, suggests itself in particular. Connections such as screwing- down and additional gluing, or clamping and additional gluing etc. can be used. The brake booster is not secured to the second wall in this way. Even if here there can possibly be contact between the brake booster and the second wall in some circumstances, there is no rigid attachment which would make possible structure-borne noise transmission and thus would lead to noise input into the interior of the motor vehicle.

Air conduction of noise is also avoided because the brake booster completely covers the region of the recess and thus there are no openings left through which air-borne noise from the engine compartment could reach the interior of the motor vehicle.

Further advantages arise from the fact that the brake booster is practically an integral component of the first wall of the face wall and thus on the one hand represents a reinforcement of this first wall and on the other hand the acoustically effective mass of this face wall is drastically increased. Especially in conjunction with additional reinforcing measures for this first wall, it thus becomes possible for this wall or desired partial regions thereof to be considered as "a mass oscillator" and to be thus less susceptible to vibration.

In this context, reference is made to the German patent application of the present applicant "Face wall module", filed on the same day as the present application, internal file number F02049. All the embodiments described there or respectively all the details regarding the structure of the face wall module there (relating to material, arrangement of the first and second walls with respect to one another) and in relation to acoustic viewpoints (increase in the acoustically effective mass of one wall of the sandwich, incorporation of the sandwich, numerical values quoted for same) should count as a constituent part of the present application. It is thus expressly emphasised that the corresponding passages of the quoted application are incorporated in this application in order to avoid unnecessary repetitions of the passages there.

In summary, the advantages of the present structure are thus acoustic decoupling of the cover layer on the passenger side of the face wall (i.e. of the second wall from the first wall). An improved seal for the engine compartment and the driver's space, a minimising of the number of openings in the face wall, improved assembly/dismantling conditions and a minimising of the tendency of the brake booster to cause oscillation, i.e. a minimising of the mechanical stresses on the face wall.

Advantageous developments of the present invention are described in the dependent claims.

A first advantageous development provides for the brake booster to have an edge surface which rests on the edge region of the recess. In this way it is possible for there to be a complete connection between the brake booster and the edge region (in contrast to attachment only at certain points). In this way, the entry of air-borne noise is avoided. Moreover higher stability is achieved by the secure attachment of the brake booster.

For even greater stabilisation, the edge region of the recess can be reinforced, i.e. in this region a greater wall thickness is provided or respectively an additionally reinforcing component is incorporated.

Especially for the purposes of stability, it also makes sense for the recess and the edge surface to be round, in order for example to guarantee uniform stability against shearing stress.

It is particularly advantageous that there is arranged between the edge surface of the brake booster and the edge region of the recess an elastomer ring which belongs to the brake booster. By this means, the passage of air-borne noise is further minimised; furthermore structure-borne noise is dampened. Naturally this measure is possible even without reinforcement of the edge region of the recess.

A further advantageous development provides for the brake booster to be screwed to the first wall. Naturally there are also other possible ways of joining (bracing by means of clamps, gluing, etc.; however joining by means of screws is the most favourable for assembly or dismantling). In addition, gluing together is naturally also possible.

A further advantageous development provides for the second wall to have a feed-through aperture for the corresponding part of the brake booster. The brake booster is thus also arranged inside the face wall; this produces even better utilisation of the structural space in the sandwich region. In the region of the feed-through aperture for the brake booster, a gap is preferably provided between the brake booster and the feed-through aperture, such that there cannot be any contact between the two components and thus any structure-borne noise transmission. In terms of vibration technology it is particularly advantageous if the gap between the feed-through aperture and brake booster is between 1 and 5 mm in the region of the feed-through aperture.

A further advantageous development provides for the face wall to have curvatures in the region of the recess and/or the feed-through aperture. What is thereby achieved is firstly that the stability of the face wall in these regions is increased and thus also the acoustic properties of the individual walls are improved, since larger regions are "acoustically effective" i.e. can be regarded as oscillation units.

In addition to this, reinforcing webs can also possibly be provided in the region of the recess or of the feed-through aperture, which makes the mass of the brake booster even more "acoustically effective" (for the description of this effect, see also the above-quoted application of the present applicant).

A further advantageous development provides for foam to be arranged between the first and second walls. This foam serves here less to attach the first and second walls. The main purpose of the foam is to eliminate air-borne noise and to dampen structure-borne noise so that no noise transmission is possible from the first wall to the second wall.

This foam can be embodied in various ways. It is e.g. possible for a foam layer of constant thickness to be provided between the first and second walls, which itself does not alter its thickness in the region of the brake booster; (in this case, cavities possibly also arise inside the curvature in the region of the recess; this means that the fitting of brake boosters of different sizes is possible e.g. for different types of motorisation). It is naturally also possible for the entire space between the first and second walls to be filled with foam or for the entire brake booster also to be foamed into this space. In this case, it is also possible for the brake booster to be covered on its outer surface with a foam-repelling material. By this means the brake booster, when embedded in foam, is not connected inseparably to the face wall; this is important for changing a brake booster. A PU-foam is advantageously used as the foam here.

A further advantageous development provides for the face wall to be designed as a module for mounting in a face wall frame of the body of a motor vehicle. Regarding the face wall module and the materials provided for same, extensive reference is again made to the preceding application of the same applicant. It is important here that the first and second walls are inter-connected in their respective edge regions in order thus to represent overall a unit.

Further advantageous developments are quoted in the remaining dependent claims.

The invention will now be explained with the aid of a number of figures. These show:

FIG. 1 a cross-section through a face wall according to the invention, a section outside the recess in which a brake booster is accommodated being shown below the centre line of FIG. 1, and/or, above the centre line, a section through the centre of the recess for the brake booster, as well as FIG. 2 the body of a motor vehicle seen from the interior of the motor vehicle.

FIG. 1 shows a face wall 1. This face wall 1 comprises a first wall 3a and a wall 3b at a spacing from same. Between the first wall 3a and the second wall 3b is provided (in this case, but not necessarily) foam 12. The first wall 3a has a recess 4 to accommodate a brake booster 5 which is fastened solely to the first wall 3a. This brake booster has, as the centre line of FIG. 1 indicates, a substantially rotationally symmetrical cross-section, at least in the region of the recess.

On the left side of FIG. 1 is shown the engine compartment side of the motor vehicle; a supply aperture for brake fluid 15 can also be seen. On the right-hand side of the face wall 1 can be seen an actuating lever (a piston rod) which is connected to a brake pedal of the motor vehicle. The recess 4 is designed substantially rotationally symmetrical. The edge region 6 of the recess 4 is reinforced, i.e. in this region a substantially circular flange is provided in which the wall thickness is greater than in the rest of the first wall 3a. The brake booster 5 has an edge surface 7 corresponding to the edge region 6 of the recess 4. Between edge surface 7 and edge region 6 is arranged an elastomer ring 8 (or an elastomer disc) which belongs to the brake booster 5, and which substantially prevents the air conduction of noise from the engine compartment to the gap between the first wall 3a and the second wall 3b. The brake booster 5 is screwed in an edge surface to the edge region of the recess via screws 17. These screws 17 are screwed into the reinforced edge region of the recess and can possibly also be additionally dampened.

In the region of a feed-through aperture 10 in the second wall 3b, the brake booster 5 has a considerably smaller diameter than in the region of the edge surface 7. Between the diameter of the brake booster in the region of the feed-through aperture and the feed-through aperture 10 itself is provided a gap 11 which has a size of between 1 mm and 20 mm, preferably between 1 mm and 5 mm. What is thereby achieved is that structure-borne noise transmission is very largely avoided even when there are quite severe vibrations.

In FIG. 1 can be easily recognised that the face wall has curvatures in the region of the recess 4 or the feed-through aperture 10. These curvatures serve firstly to accommodate the brake booster and thus to utilise the structural space as well as possible. In addition, this curvature in the region of the brake booster serves to provide an additional reinforcement in this region, and thus the region around the brake booster is "acoustically effective", especially in the first wall 3a.

Foam 12 is arranged between the first wall 3a and the second wall 3b. In the embodiment according to FIG. 1 this foam has an approximately constant layer thickness, i.e. in the region of the recess 4 an air gap is partially formed. The foam extends in the region of the feed-through aperture 10 as far as the brake booster and touches the latter, so that it has a vibration-reducing effect.

With respect to the provision of foam, however, other variants are also conceivable. Thus it is for example possible to fill the entire space between the first wall 3a and second wall 3b with foam, such that even the recess 4 is totally foam-filled. In this case it is also possible for the brake booster, which is then already coupled to the first wall before the foaming process, to be covered with a foam-repelling material so that there can be easier detachment of the brake booster later.

The first wall 3a and second wall 3b are here made of plastics material. Regarding further details of the choice of material, reference is made to the application of the same applicant, referred to above.

Figure 2:
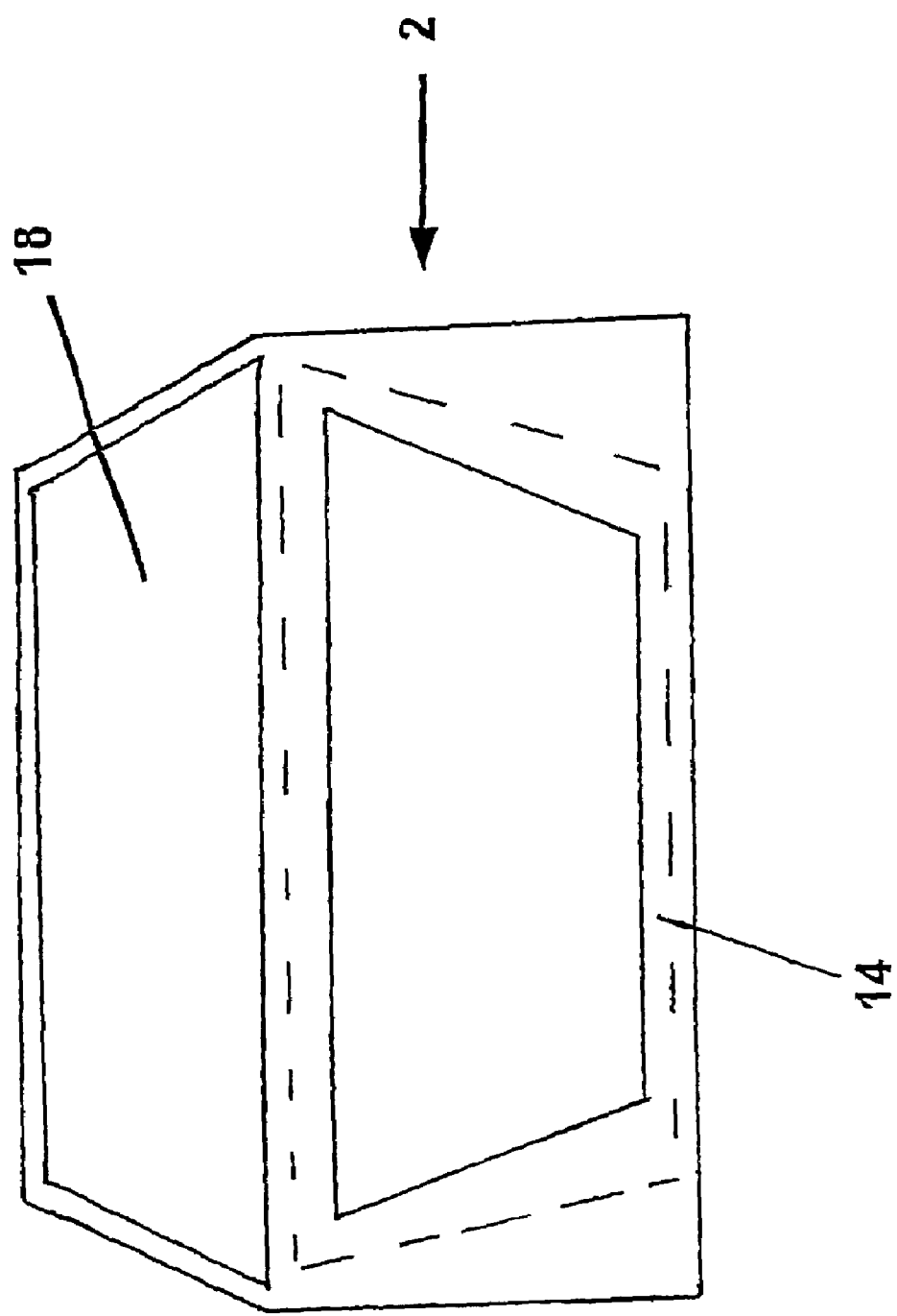

FIG. 2 shows the body of a motor vehicle 2, seen from the interior of the motor vehicle. Here in the upper region a windscreen aperture 18 can be seen as well as a face wall frame 14 below same, into which a face wall module can be inserted. Regarding all the details of this face wall module, reference is made to the corresponding figure in the prior application of the same applicant, referred to above. The present invention relates thus to a face wall for a motor vehicle, the face wall having a first wall and a second wall at a spacing therefrom. The first wall has a recess to accommodate a brake booster which is attached solely to the first wall. The second wall has, matched to this, a feed-through aperture for the brake booster. Thus it is therefore possible for the brake booster to completely penetrate the face wall; there is thus an "aligned" aperture which is completely penetrated by the brake booster. Here it is also useful in the sense of optimising structural space that a part of the space provided inside the face wall serves to accommodate the brake booster. This space can also be advantageously filled with foam, such that there is very good soundproofing. Especially the problems of securing conventional brake boosters which, in the presence of a bridge for structure-borne noise between the two walls (cover layers), or of a bridge for air-borne noise through the generally continuous bores of the face wall and the attachment of the brake booster, lie far outside the latter's centre of gravity, do not occur with the present invention. This produces optimal soundproofing; moreover it practically excludes the possibility that, as the motor vehicle travels, there is inherent vibration of the brake booster which can release high unwanted forces.

The invention claimed is:

1. A face wall for a motor vehicle, the face wall having a first wall and a second wall at a spacing from the first wall wherein the first wall has a recess having a reinforced edge region to accommodate a brake booster which is fastened solely to the first wall.

2. A face wall according to claim 1, wherein the brake booster has an edge surface which rests on the edge region of the recess.

3. A face wall according to claim 2, wherein an elastomer ring is arranged on the edge surface of the brake booster on the side oriented towards the edge region.

4. A face wall according to claim 1 wherein the brake booster is screwed to the first wall.

5. A face wall according to claim 1 wherein the face wall is a module for mounting in a face wall frame of the body of a motor vehicle.

6. A face wall according to claim 1 wherein at least one of the first wall and the second wall is formed from one of plastics material and metal.

7. A motor vehicle containing a face wall according to claim 1.

8. A face wall according to claim 1 wherein the face wall has reinforcing webs in the region of the recess.

9. A face wall according to claim 1 wherein foam is arranged between the first wall and the second wall.

10. A face wall according to claim 1 wherein the brake booster is covered on its outer surface with a foam-repelling material.

11. A face wall for a motor vehicle, the face wall having a first wall and a second wall at a spacing from the first wall wherein the first wall has a recess to accommodate a brake booster which is fastened solely to the first wall, the second wall having a feed-through aperture for the brake booster.

12. A face wall according to claim 11, wherein the gap between the feed-through aperture and brake booster is between 1 mm and 20 mm in the region of the feed-through aperture.

13. A face wall according to claim 11 wherein the face wall has curvatures in the region of at least one of the recess and the feed-through aperture.

14. A motor vehicle containing a face wall according to claim 11.

15. A face wall for a motor vehicle, the face wall having a first wall and a second wall at a spacing from the first wall wherein the first wall has a recess to accommodate a brake booster which is fastened solely to the first wall, the face wall having reinforcing webs in the region of the recess.

16. A motor vehicle containing a face wall according to claim 15.

17. A face wall for a motor vehicle, the face wall having a first wall and a second wall at a spacing from the first wall wherein the first wall has a recess to accommodate a brake booster which is fastened solely to the first wall, foam being arranged between the first wall and the second wall.

18. A motor vehicle containing a face wall according to claim 17.

19. A face wall for a motor vehicle, the face wall having a first wall and a second wall at a spacing from the first wall wherein the first wall has a recess to accommodate a brake booster which is fastened solely to the first wall, the brake booster being covered on its outer surface with a foam-repelling material.

20. A motor vehicle containing a face wall according to claim 19.

* * * * *